Patented Mar. 15, 1949

2,464,236

UNITED STATES PATENT OFFICE 2,464,236

OXIDATION OF SOYA SITOSTERYL ACETATE DIBROMIDE

Percy L. Julian, Maywood, and William J. Karpel and Jack W. Armstrong, Chicago, Ill., assignors to The Glidden Company, Cleveland, Ohio, a corporation of Ohio No Drawing. Application May 8, 1946, Serial No. 668,312

5 Claims. (Cl. 260—397.4)

The present invention relates to an improved process for the oxidation of soya sitosteryl acetate dibromide to yield dehydro-iso-androsterone.

Numerous procedures have been described in the literature for the oxidative degradation of the side chain of sterols. Most of these processes are cumbersome when large quantities of sterols are employed in that in all of them large quantities of solvent are employed in which solvent-sterol solutions the oxidations are carried out. Chromic acid in glacial acetic acid is the almost universally employed oxidation mixture, and the chromium salts which result are not easily removed, their presence during the debromination and isolation of the end products causing consumption of disproportionate quantities of debrominating agent, as well as alkali in the removal of contaminating acids. In U. S. Patent No. 2,244,968, Schwenk and Whitman recommend for cholesterol a mixture of chromic acid, sulfuric acid, and glacial acetic acid as the oxidation mixture, in which the amount of sulfuric acid is only about one-third that required to form chromium sulfate from all of the chromium-ion (2.5 kg. as against 7.7 kg. required). They also recommend a ratio of acetic acid to cholesteryl acetate dibromide of approximately 50 to 1. In U. S. Patent No. 2,323,584, the patentees recommend a ratio of glacial acetic acid to the sterol acetate dibromides of from 33 to 1 to 60 to 1. In addition to the initial cost, these volumes of glacial acetic acid have a marked additional effect on the economy of the process, since not only large equipment is required, but its removal is costly and time-consuming.

It is therefore an object of the present invention to provide an improved process for the preparation of dehydro-iso-androsterone.

A further object is to provide an improved process for the preparation of dehydro-iso-androsterone from sitosteryl acetate dibromide.

An additional object is to provide an improved process for preparing dehydro-iso-androsterone from sitosteryl acetate dibromide whereby the removal of chromium used for the oxidation is facilitated.

Another object is to provide a more economical process for producing dehydro-iso-androsterone.

Other objects will be apparent from the following description.

It has been found that the oxidation of soya sitosteryl acetate dibromide is greatly facilitated by suspending 1 part of the dibromide in preferably as little as 5 to 10 parts of glacial acetic acid, and adding solid chromic acid portion-wise to this mixture, while at the same time dropping in concentrated sulfuric acid. At this concentration and in the absence of added water, the major portion of the chromium sulfate formed crystallizes out and can be readily separated by filtration or centrifuging. Also owing to the absence of added water, there is no gummy precipitate formed which would be difficult to separate, such as usually occurs when the chromic acid is added in aqueous solution.

Since the bulk of the chromium sulfate has been removed, the quantity of zinc dust required to effect debromination is greatly reduced by virtue of the fact that very little zinc is consumed in reducing chromic salts.

Other economies are, of course, in the amount of acetic acid conserved and in the size of the equipment necessary to treat a given amount of raw material.

The amount of acetic acid may vary somewhat. About 5 parts of acetic acid to 1 part of the sitosteryl acetate dibromide is as low as one can conveniently go in dilution, due to the thickness of the mixture, but this ratio is within the operable limits. One may go as high as a ratio of 10 parts of acetic acid to one part of sitosteryl acetate dibromide, but amounts noticeably higher than this will not ordinary be used.

The amount of sulfuric acid will, of course, be at least such as to form sufficient chromium sulfate to exceed its solubility in the mixture. Preferably the amount will be from 50 to 100% of that stoichiometrically required to form chromium sulfate from all of the chromium added. The greatest removal of chromium, of course, is theoretically obtained by the larger amount of sulfuric acid, but the larger amounts should be added cautiously to prevent too high a temperature during the preparation of the mixture.

The following example is illustrative of the invention:

Example

To a large reaction chamber (60 gallons) containing 370 pounds of glacial acetic acid was added 50 pounds of solvent free soya sitosteryl acetate dibromide. After cooling to 17° C., 15.7 liters of concentrated sulfuric acid was added over a period of five and one-fourth hours, and 63⅛ pounds of $CrO_3$ added in portions of two pounds each over the same period. The reaction mixture was vigorously stirred and the temperature kept below 20° C. The cooling and agitiation was continued for six hours longer, and preferably overnight.

The mixture was then filtered and the residue of chromium salts washed with glacial acetic acid. The filtrate is then treated with 6.78 pounds of zinc dust, the temperature being kept as close to 50° C. as possible and preferably not below 35° C. During the debromination the temperature is maintained at about 50° C. for approximately two hours.

After debromination the liquor is concentrated under vacuum down to a thin syrup. The hot concentrate is poured into 30 liters of water, and extracted three times with 22 liter portions of benzene.

The aqueous portion was discarded and the benzene extract then washed with water to remove excess acetic acid and any remaining chromium salts. The benzene solution is then agitated with 10% NaOH solution until the alkaline layer is clear and free from solid sodium salts, after which the benzene solution is washed with water until neutral.

The benzene is then removed under vacuum. The thick reddish viscous mass is dissolved in methanol and then treated with an aqueous solution containing semicarbazide hydrochloride and sodium acetate, and the semicarbazone of dehydro-iso-androsterone acetate is recovered in the conventional manner. This is then hydrolyzed to dehydro-iso-androsterone.

It is to be noted that the quantity of acetic acid used is materially less than in the prior art procedures, and that even though the sitosteryl acetate dibromide is not completely in solution the reaction proceeds with the normal rapidity obtained with $CrO_3$-$H_2SO_4$ mixtures. It is also to be noted that the quantity of zinc dust is only a fraction of that employed by the prior art. This, in addition to the saving per se in the quantity used, results in the formation of only a fraction of the quantity of zinc acetate and thus effects further savings in the quantities of solvents used in the extractions and the volumes to be handled.

It will be understood that the foregoing example is merely illustrative and that various changes and modifications may be made therein without departing from the spirit and scope of the invention.

The term "soya sitosterol" has been generically used to identify the sterols present in soya sterols other than stigmasterol. A number of different sitosterols have been reported in the literature, and Fernholz has reported a sterol which he called campesterol which he obtained from soya sterols. The original meaning, however, is used herein, and the item "sitosteryl acetate dibromide" as used herein refers to the dibromo acetates of the sterols present in soy beans, other than stigmasterol.

Having described the invention what is claimed is:

1. The process of degrading the side chain of soya sitosterols which comprises effecting oxidation of the side chain of soya sitosteryl acetate dibromide by treatment of a slurry thereof in glacial acetic acid with chromic acid and sulfuric acid under substantially anhydrous conditions.

2. The process of degrading the side chain of soya sitosterols which comprises forming a slurry of soya sitosteryl acetate dibromide in glacial acetic acid, and gradually adding concentrated sulfuric acid and solid chromium trioxide to the slurry while maintaining a temperature not exceeding 20° C. to effect oxidation of the side chain of the sitosteryl acetate dibromide, the amount of sulfuric acid being such that the quantity of chromium sulfate formed exceeds its solubility in the mixture, removing the precipitated chromic sulfate from the solution, and then treating the solution with zinc.

3. In the process of forming dehydro-iso-androsterone from soya sitosteryl acetate dibromide by oxidation with chromic acid in the presence of concentrated sulfuric acid, the improvement which comprises adding the chromic acid in solid form and the sulfuric acid gradually to a slurry of the sitosteryl acetate dibromide in glacial acetic acid, the quantity of sulfuric acid being such that the amount of chromic sulfate formed exceeds its solubility in the mixture.

4. In the process of forming dehydro-iso-androsterone from soya sitosteryl acetate dibromide by oxidation with chromic acid in the presence of concentrated sulfuric acid, the improvement which comprises adding the chromic acid in solid form and the sulfuric acid gradually to a slurry of the soya sitosteryl acetate dibromide in glacial acetic acid, the quantity of sulfuric acid being such that the amount of chromic sulfate formed exceeds its solubility in the mixture, removing the precipitated chromic sulfate from the solution, and then treating the solution with zinc.

5. The process of degrading the side chain of soya sitosterols which comprises forming a slurry of soya sitosteryl acetate dibromide in from 5 to 10 parts of glacial acetic acid by weight of the sitosteryl acetate dibromide, gradually adding solid chromic acid and concentrated sulfuric acid to the slurry while maintaining a temperature not exceeding 20° C. to effect oxidation of the side chain of the sitosteryl acetate dibromide, the amount of sulfuric acid being 50 to 100% that required to form chromic sulfate with all of the chromium added, removing the precipitated chromic sulfate formed, and then treating the resulting solution with zinc.

PERCY L. JULIAN.
WILLIAM J. KARPEL.
JACK W. ARMSTRONG.

REFERENCES CITED

The following references are of record in the file of this patent:

UNITED STATES PATENTS

| Number | Name | Date |
|---|---|---|
| 2,244,968 | Schwenk | June 10, 1941 |

FOREIGN PATENTS

| Number | Country | Date |
|---|---|---|
| 558,361 | Great Britain | Jan. 3, 1944 |